Dec. 6, 1960 G. F. KASSON ET AL 2,962,925
SECONDARY OBSERVATION WINDOW FOR A TRACKING TELESCOPE
Filed June 24, 1949 2 Sheets-Sheet 1

INVENTORS
GLENDON F. KASSON
NORMAN H. FOSS
BY Herbert E. Metcalf
attorney

Dec. 6, 1960 G. F. KASSON ET AL 2,962,925
SECONDARY OBSERVATION WINDOW FOR A TRACKING TELESCOPE
Filed June 24, 1949 2 Sheets-Sheet 2
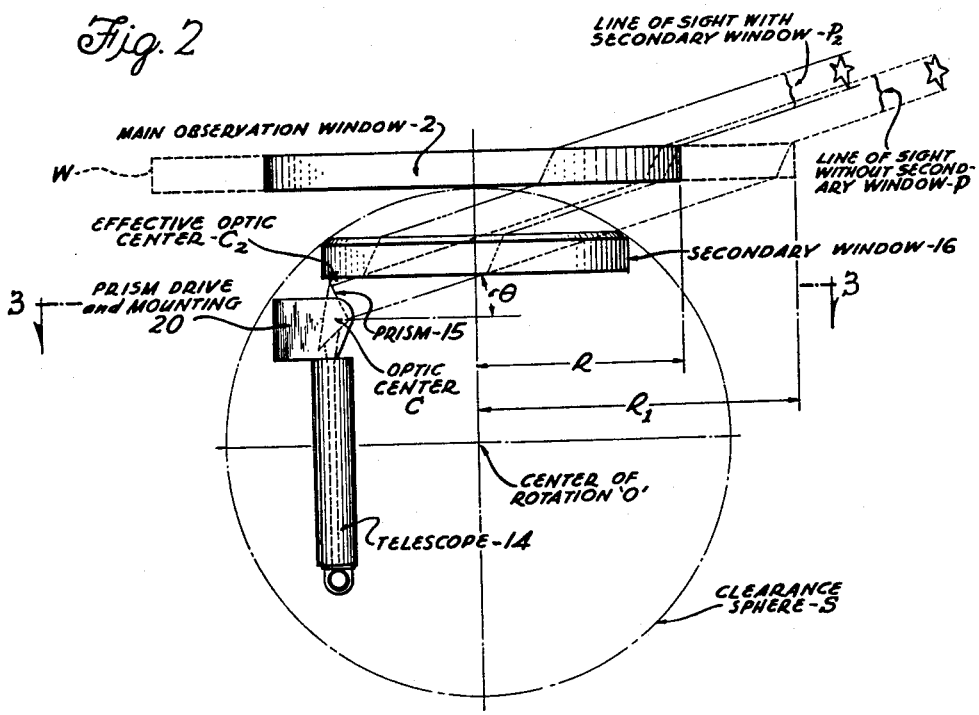
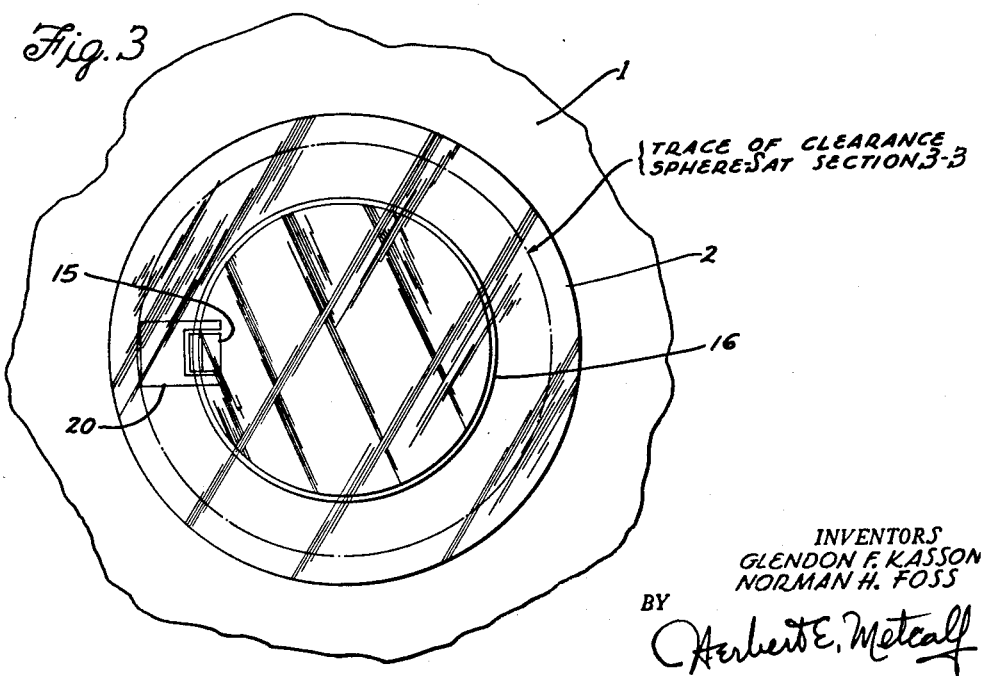
INVENTORS
GLENDON F. KASSON
NORMAN H. FOSS
BY
Herbert E. Metcalf
Attorney United States Patent Office 2,962,925
Patented Dec. 6, 1960

2,962,925
SECONDARY OBSERVATION WINDOW FOR A TRACKING TELESCOPE

Glendon F. Kasson, Hawthorne, and Norman H. Foss, Los Angeles, Calif., assignors to Northrop Corporation, Hawthorne, Calif., a corporation of California Filed June 24, 1949, Ser. No. 101,068

6 Claims. (Cl. 88—1)

The present invention relates to observation means, and more particularly to a star tracking telescope system for automatic celestial navigation of aircraft, such as guided missiles.

If the geometric altitude of a craft of moderately high speed be held nearly constant by, for example, an altimeter, then it can be shown that the motion of the craft in a trajectory between two points above the earth's surface can be uniquely specified, as a function of time, in terms of the direction of a plumb bob carried on board. The direction of the plumb bob can be given in most cases by angular reference to two star lines, e.g., the angles between the projected plumb bob line, or zenith, and the apparent lines to each star. The complements of these angles are apparent star altitudes, and specify the parallel planes in space which are normal to the plumb bob. Moreover, the azimuthal angles in these planes can be indexed against the apparent lines of bearing to the stars, respectively.

For any given track and time-schedule, determined on a map from tactical or meteorological considerations, for example, these apparent star altitudes at every instant of flight may be computed from available astronomical data. These computed results may be produced, or reproduced, on board during flight, and fed into devices which lay down the specified apparent horizontal plane with respect to star lines physically established on board by automatic star-tracking telescopes, free gyros, or combinations thereof. It can be shown that if at any instant, the observed plumb bob coincides with the specified plumb bob, then the craft is either at the specified position on the trajectory, or is accelerating towards that position. If the craft is initially displaced from the specified position and its subsequent motion controlled so that the observed and specified plumb bobs always coincide, i.e., the plumb bob error is continually zero, then the craft will swing about the specified moving position as if it were an earth's radius pendulum.

The implementation of the theory presented above requires an automatic celestial navigation system carried in the craft. In brief such a system comprises the following major components:

(1) *A specified trajectory computer*

A device for producing on board the craft, according to proper time schedule, the star altitudes which determine orientation of the specified apparent horizontal plane whose normal determines the specified apparent gravity vertical.

(2) *A star-stabilized (inertial) platform*

An apparent horizontal plane supported within the craft in a gimbal system having three degrees of freedom. The following components may be attached to the inertial platform:

(a) *Altitude angle setting devices.*—For translating the computer signals into angles mechanically laid off between star trackers and the platform.

(b) *Star trackers.*—Telescopes equipped with light sensitive devices, error sensors (scanners), and associated servo systems which orient the inertial platform so that chosen stars remain in the center of the telescope field at all times.

(c) *Gyros.*—Two free gyros suspended in independent gimbal systems attached to the inertial platform, but which can also be caged directly to the platform, with associated servo and phantom systems. These supplement, or replace, the star trackers for maintaining star-stability of the platform, when required.

(d) *Plumb bob error detectors.*—Bubble levels with error signal pick-offs which detect deviations of the observed plumb bob from the specified apparent vertical direction.

(3) *Track keeper*

A device which continuously integrates the craft's equations of motion, including pendulum-type oscillations, in terms of deviation of the plumb bob from the specified apparent vertical. The output of the track keeper is the actual position of the craft with respect to the specified position on the trajectory.

(4) *Launching and pre-celestial guidance*

A system for controlling the craft from the launching point so that the craft arrives at the beginning of the specified motion, so that pre-selected stars can be picked up for tracking.

(5) *Terminal guidance*

A system for controlling the craft from the end of specified celestial trajectory to the target of destination.

(6) *Master controller*

A sequencing device for selecting various phases of the guidance system according to a predetermined time schedule.

(7) *Autopilot*

A system for transforming the various navigational signals into motions of the control surfaces and engine throttle of the craft.

The present invention has to do with the star trackers set forth above in paragraph 2(b), and the problems involved in tracking stars from inside the craft.

In a guided missile of the type requiring automatic celestial navigation, it is highly desirable that the observation window, through which celestial observations are to be made, be flush with the external skin of the craft, so that a minimum air drag results, be flat, and be of minimum size.

It is an object of the invention to provide a means whereby telescopic observation through a flat observation window, from a relatively fixed location or optic center with relation to that window, may be made at a lower complementary angle of the angle of incidence when, for a given size of observation window, the optic center is not at the optimum location with respect to the window.

It is another object of the invention, to provide means for effectively raising the optic center of a star observing means to a closer proximity of an observation window in order to provide the smallest possible size of an observation window for a given angle of view for the observing means.

The conditions of design for an optical system observing an object through a flat window are strict, where the window has to be of minimum size.

The desirability of providing a design based on minimum window size is important due to two factors:

(1) The difficulty of fabricating optical glass of proper transparency in large sizes; and (2) The difficulty in maintaining good optic accuracy in large pieces of optical glass, due to flexure, heat differentials, etc.

The main design conditions of a horizon stabilized instrument observing an object through a flat circular window in an aircraft where a minimum size of window is specified are as follows:

(1) The line of sight must cross the line perpendicular to the window and central to its periphery of the observation window.

(2) The upper ray of the line of sight must be tangent, or nearly tangent to the clearance sphere of the inertial platform on which the tracking telescopes are mounted.

(3) The clearance sphere of the inertial platform must be of minimum possible size commensurate with the equipment required to be mounted thereon, and the clearance sphere must be as close as possible to tangent with the surface of the observation window.

(4) The observing means or telescope must be some form of periscope, with an optic center, i.e., center of rotation of line of sight, or entrance pupil, at or very close to the surface of the clearance sphere of the inertial platform.

When any or all of the latter four design conditions cannot be complied with, due to other design considerations which outweigh the window problem in importance, then the observation window will necessarily have to be larger than minimum size.

It is still another object of the present invention, to provide a compensation for the condition where the optic center of the observing means is not located at its optimum position, and to make this compensation in such a manner that the size of the observation window is still maintained close to the minimum size.

Briefly, the present invention is applicable to a guided missile having a flat observation window on a surface thereof, and comprises a stabilized platform having star observation means mounted thereon positioned to pick up and track predetermined stars through the observation window. In order that the actual optic center of the observing means be as close as possible to the window, the light from a star is received on a prism and then reflected to a telescope vertically mounted on the platform. The prism is movable in azimuth and elevation under proper control for tracking the star, and preferably the entire platform is enclosed so that the enclosure, and contents can be held at a substantially uniform temperature during flight. In order that the observation window be kept at minimum size, a secondary window is utilized attached to the inertial platform and positioned between the tracking prism and the observation window. The secondary window effectively raises the optic center of the observing means, this secondary window having refractive characteristics that raise the line of sight to the star.

The invention will be more clearly understood by reference to the drawings, which show the inertial platform of a preferred automatic celestial navigation system embodying the present invention.

In the drawings:

Figure 2 is a diagrammatic side view showing the optical effect of the use of a secondary window.

Figure 3 is a diagrammatic top view of the optical set-up shown in Figure 2.

Figure 1:
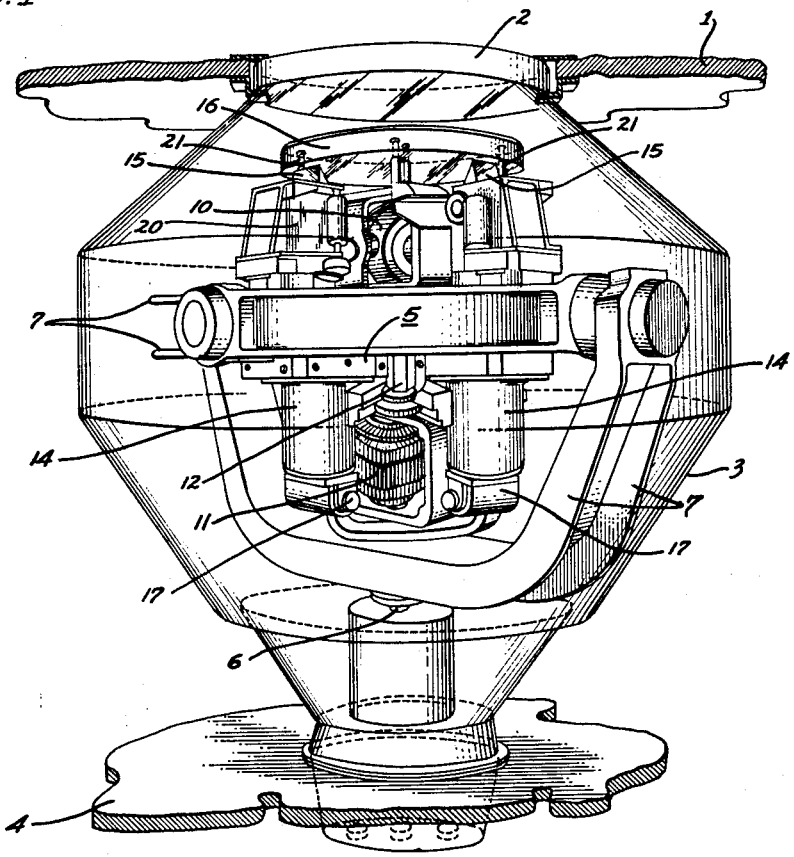
Figure 1 is a diagrammatic phantom view of a perspective view of an inertial platform as mounted in a guided missile, utilizing the preferred form of the present invention in the optical systems carried by the platform.

Referring first to Figure 1, a surface 1 of a guided missile or automatically navigated craft is provided with a flat main observation window 2. This window is ground and polished to have optically flat and parallel inner and outer faces, to the extent of present practical optical techniques, and is made from optical glass. The thickness should preferably be of a minimum size consistent with bending stresses encountered in flight due to reduced atmospheric pressures at high altitudes, i.e., from 30,000 ft. to 50,000 ft.; and its own weight.

A platform enclosure 3 is fixed to the missile frame 4 and extends upwardly to window 2 to enclose a stabilized inertial platform 5. The enclosure 3 is for the purpose of air conditioning the enclosed platform and the instruments carried thereby. Platform 5 has three degrees of freedom, rotating on vertical axis 6 and supported by gimbals 7.

In the particular navigation system above discussed, the inertial platforms carry the following elements, shown in Figure 1, as follows:

A directional gyroscope 10,
A vertical gyroscope 11,
A bubble level assembly 12,
Four vertical star tracking telescopes 14,
Four tracking prisms 15 for the telescopes 14,
A secondary window 16,
Photocell pickups 17 for the telescopes 14,
A prism drive and mounting 20.

The relationship of a telescope 14, the associated prism 15, prism drive and mounting 20, and the observation windows 2 and 16 are shown diagrammatically in Figures 2 and 3.

The prisms of the telescopes are positioned close to the edge of the clearance sphere of the inertial platforms, this sphere being indicated by broken line S in Figures 2 and 3. The optical center C of the one prism 15 shown in Figures 2 and 3 is well below its optimum position, due to clearance considerations of the prisms, their drives and their mountings 20. In this position of the prisms the optimum size of the main observation window 2 for a minimum angle of view $\theta$ would require a radius $R_1$, which would bring the window to a size indicated by broken window line W if no secondary window were to be used. The light path without secondary window 16 is indicated by P.

However, the secondary window 16 supported over the prisms 15 by supports 21 (Figure 1) because of its refractive characteristics as indicated by light path $P_2$ effectively raises the optic center to point $C_2$, thereby permitting the reduction of the radius of the observation window to R, without changing the desired observation minimum angle $\theta$.

Secondary window 16 is smaller than the main observation window 2 and is, of course, similar to the observation window optically.

Specific window dimensions that have been found satisfactory in the practice of the present invention are as follows:

Main observation window 1¼″ thick by 18⅞″ diameter.
Secondary window 1⅜″ thick by 12⅞″ diameter.
Minimum observation angle $\theta = 15$ degrees.

In addition to the optical advantages of the use of a secondary window on the inertial platform of an automatic celestial navigation system, the window in the device described herein is useful in the capacity of a transparent counter weight for the gimballed platform assembly that is free to rotate about three axes intersecting at the center of rotation O (Figure 2) of the platform 5. The secondary window being attached to the platform assembly always moves with it and helps balance out a heavy mass condition of the platform with a center of gravity below the center O. This, of course, is done without detracting, in any serious way, from the visibility or angular field of the device.

A summary of the advantages provided by this invention include:

(a) It permits use of a smaller size main observation window to result in easier produceability, greater optical accuracy.

(b) The smaller main window, when mounted on an aircraft frame, will be more aerodynamically efficient by virtue of closer conformity with a surface of the craft, and because it can be so mounted as to have no protruding surfaces.

(c) The secondary window acts as a balance which does not interfere with the optic field of view and therefore can correct, simply, an unbalanced condition about one axis without introducing a new unbalance about either of the other 90° axes (because it is symmetrical about an axis).

(d) Where it is not required to reduce the size of the observation window, the advantage of effectively raising the optic center may be used to increase the range of view by decreasing the minimum allowed observation angle θ.

(e) As an effective baffle between the main observation window and the servo units of the platform, the secondary window reduces the temperature gradient across the main window.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a missile guided by a celestial navigation device, a flat observation window forming a portion of the dorsal surface of said missile, a platform mounted in said missile and movable to have three degrees of freedom with respect to said missile, said platform being stabilized in the plane of the horizon, an optical system including a telescope mounted on said platform, a prism mounted on said platform to move in elevation to direct light from a star into said telescope, and defining an actual entrance pupil for said telescope, and means for creating an effective entrance pupil for said optical system closer to said observation window than said actual entrance pupil, said latter means including a flat secondary window mounted on and to move with said platform above said optical system between said actual entrance pupil and said observation window, said prism being mounted adjacent the periphery of said secondary window whereby due to the refraction of said secondary window, stars closer to the horizon than can be sighted through said actual entrance pupil, can be sighted through said effective entrance pupil.

2. In a missile guided by a celestial navigation device, a flat observation window forming a portion of the dorsal surface of said missile, a platform mounted in said missile and movable to have three degrees of freedom with respect to said missile, said platform being stabilized in the plane of the horizon, an optical system including a telescope mounted on said platform, a prism mounted on said platform to move in elevation to direct light from a star into said telescope, and defining an actual entrance pupil for said telescope, and means for creating an effective entrance pupil for said optical system closer to said observation window than said actual entrance pupil, said latter means including a flat secondary window mounted on and to move with said platform above said optical system between said actual entrance pupil and said observation window, said prism being mounted adjacent the periphery of said secondary window whereby due to the refraction of said secondary window, stars closer to the horizon than can be sighted through said actual entrance pupil, can be sighted through said effective entrance pupil, said prism having a fixed relation to said platform and to said secondary window except for said movement in elevation.

3. Apparatus in accordance with claim 1 wherein said telescope is mounted normal to the stabilized plane of said platform.

4. Apparatus in accordance with claim 2 wherein said telescope is mounted normal to the stabilized plane of said platform.

5. In a missile guided by a celestial navigation device, a flat observation window forming a portion of the dorsal surface of said missile, a platform mounted in said missile and movable to have three degrees of freedom with respect to said missile, said platform being stabilized in the plane of the horizon, an optical system including a telescope mounted on said platform, light reflecting means mounted on said platform to move in elevation to direct light from a star into said telescope, and defining an actual entrance pupil for said telescope, and means for creating an effective entrance pupil for said optical system closer to said observation window than said actual entrance pupil, said latter means including a flat secondary window mounted on and to move with said platform above said optical system between said actual entrance pupil and said observation window whereby due to the refraction of said secondary window, stars closer to the horizon than can be sighted through said actual entrance pupil, can be sighted through said effective entrance pupil.

6. In a missile guided by a celestial navigation device, a flat observation window forming a portion of the dorsal surface of said missile, a platform mounted in said missile to have three degrees of freedom with respect to said missile, said platform being stabilized in the plane of the horizon, an optical system mounted on said platform and having the entrance pupil thereof a sub- on said platform having the entrance pupil thereof a substantial distance below said observation window and directed toward said observation window, at least a portion of said optical system at said entrance pupil being movable in elevation, and a flat secondary window mounted on and moving with said platform above said optical system and positioned in the line of sight from said optical system to an object exterior of said missile, the refraction of said secondary window creating an effective entrance pupil for said optical system substantially above the actual entrance pupil, whereby the elevational range over which exterior objects can be sighted by said optical system is increased for any given size of observation window.

References Cited in the file of this patent

UNITED STATES PATENTS

| | | |
|---|---|---|
| 1,857,736 | Morrison | May 10, 1932 |
| 2,031,792 | Richter | Feb. 25, 1936 |
| 2,077,398 | Clark | Apr. 20, 1937 |
| 2,102,587 | Eliel | Dec. 21, 1937 |

FOREIGN PATENTS

| | | |
|---|---|---|
| 304,927 | Italy | Jan. 21, 1933 |
| 394,285 | Great Britain | June 22, 1933 |